United States Patent
Di Tanna et al.

(10) Patent No.: US 10,336,389 B2
(45) Date of Patent: Jul. 2, 2019

(54) WINDSCREEN WIPER ASSEMBLY FOR A VEHICLE

(71) Applicant: PIAGGIO & C. S.P.A., Pontedera (Pisa) (IT)

(72) Inventors: Onorino Di Tanna, Pontedera (IT); Stefano Bartolozzi, Pontedera (IT)

(73) Assignee: PIAGGIO & C. S.P.A., Pontedera (Pisa) (IT)

( * ) Notice: Subject to any disclaimer, the term of this patent is extended or adjusted under 35 U.S.C. 154(b) by 0 days.

(21) Appl. No.: 15/518,816

(22) PCT Filed: Oct. 9, 2015

(86) PCT No.: PCT/IB2015/057733
§ 371 (c)(1),
(2) Date: Apr. 13, 2017

(87) PCT Pub. No.: WO2016/067135
PCT Pub. Date: May 6, 2016

(65) Prior Publication Data
US 2017/0240238 A1    Aug. 24, 2017

(30) Foreign Application Priority Data

Oct. 31, 2014    (IT) .............................. RM2014A0630

(51) Int. Cl.
*B62J 17/04*    (2006.01)
*B60S 1/50*    (2006.01)
(Continued)

(52) U.S. Cl.
CPC ............. *B62J 17/04* (2013.01); *B60S 1/0438* (2013.01); *B60S 1/3409* (2013.01); *B60S 1/483* (2013.01); *B60S 1/50* (2013.01); *B62J 2099/0066* (2013.01)

(58) Field of Classification Search
CPC .. B62J 17/04; B62J 2300/0066; B60S 1/3409; B60S 1/50; B60S 1/483
See application file for complete search history.

(56) References Cited

U.S. PATENT DOCUMENTS

| | | | |
|---|---|---|---|
| 4,066,291 A | * | 1/1978 | Hickman .............. B60S 1/0438 135/115 |
| 4,355,838 A | | 10/1982 | Hickman |
| 5,270,142 A | | 12/1993 | Snelling |

FOREIGN PATENT DOCUMENTS

| | | |
|---|---|---|
| EP | 1186521 A2 | 3/2002 |
| FR | 2966110 A1 | 4/2012 |

(Continued)

OTHER PUBLICATIONS

International Search Report for PCT/IB2015/057733 dated Feb. 18, 2016.

*Primary Examiner* — D Glenn Dayoan
*Assistant Examiner* — Melissa A Black
(74) *Attorney, Agent, or Firm* — Cantor Colburn LLP

(57) ABSTRACT

A windscreen assembly (10) for a vehicle 1 is described, comprising:—a windscreen panel group (11, 12) comprising a windscreen panel (11) and a support structure (12) to support the windscreen panel (11); and—a wiper group (20. The wiper group (20) comprises a wiper (13), a drive motor group (14) for actuating the wiper (13), a tank (15) for a liquid and a pump (16) operationally connected to the tank (15). The wiper group (20) is supported by the windscreen panel group (11, 12) and said windscreen assembly (10) is configured to be removably coupled to said vehicle.

16 Claims, 4 Drawing Sheets

(51) Int. Cl.
    *B60S 1/48*      (2006.01)
    *B60S 1/34*      (2006.01)
    *B60S 1/04*      (2006.01)
    B62J 99/00           (2009.01)

(56) References Cited

FOREIGN PATENT DOCUMENTS

JP        S5923752  A    2/1984
JP        H11115854 A    4/1999

* cited by examiner

WINDSCREEN WIPER ASSEMBLY FOR A VEHICLE

CROSS-REFERENCE TO RELATED APPLICATION

This application is the 35 U.S.C. § 371 national stage application of PCT Application No. PCT/IB2015/057733, filed Oct. 9, 2015, where the PCT claims priority to and the benefit of, IT Patent Application No. 102014902306005, filed Oct. 31, 2014, both of which are herein incorporated by reference in their entireties.

This description relates to the technical field of windscreens for vehicles. More particularly, this disclosure relates to a windscreen assembly comprising a windscreen panel and a wiper associated to the windscreen panel.

With reference by way of non-limiting example, in the scooter and motorcycle sector, it is known to equip a scooter or a motorcycle with a windscreen panel having the main function of making driving the vehicle more comfortable by shielding the driver from, for example, wind, rain and other elements that may negatively affect driving comfort and/or safety. In particular, in the case, for example, of rain, the rain drops that are deposited on the windscreen panel usually interfere with the driver's view and therefore affect the driving safety, especially when driving the vehicle at night. To attempt to reduce these risks, it is known to associate a wiper to the windscreen panel of a scooter or a motorcycle. In particular, if one wishes to have a relatively complete wiper system, i.e., a wiper system comprising a wiper, a motor for driving the wiper, a tank suitable to contain liquid for cleaning of the windscreen panel and a pump operatively connected to the tank, it is known to stably integrate the wiper system in the vehicle. In particular, a type of scooter is known having a roof cover and a windscreen similar to those of a motor vehicle. This type of scooter has a complete wiper system of the aforementioned type that is integrated in the scooter itself. In other words, in this wiper system, the drive motor, pump and tank of the wiper system are placed under the dashboard inside the shell of the scooter while the control devices for the actuation of the drive motor and the pump are integrated into the dashboard. The installation of a wiper system of this type requires relatively long times and is relatively difficult.

A general purpose of this description is to make available a windscreen assembly provided with a wiper associated to the related windscreen panel that allows making the installation of a relatively complete wiper system of the type discussed above faster than the solutions discussed above with reference to the known art.

This and other purposes are achieved through a windscreen assembly as defined in claim 1 in its most general form, and in the dependent claims in several particular embodiments.

This invention also covers a vehicle as defined in claim 12.

The invention will be better understood from the following detailed description of its embodiments, provided by way of example and therefore in no way limiting, in relation to the accompanying drawings, wherein.

In the annexed figures, equal or similar elements will be indicated by the same reference numbers.

Figure 1:
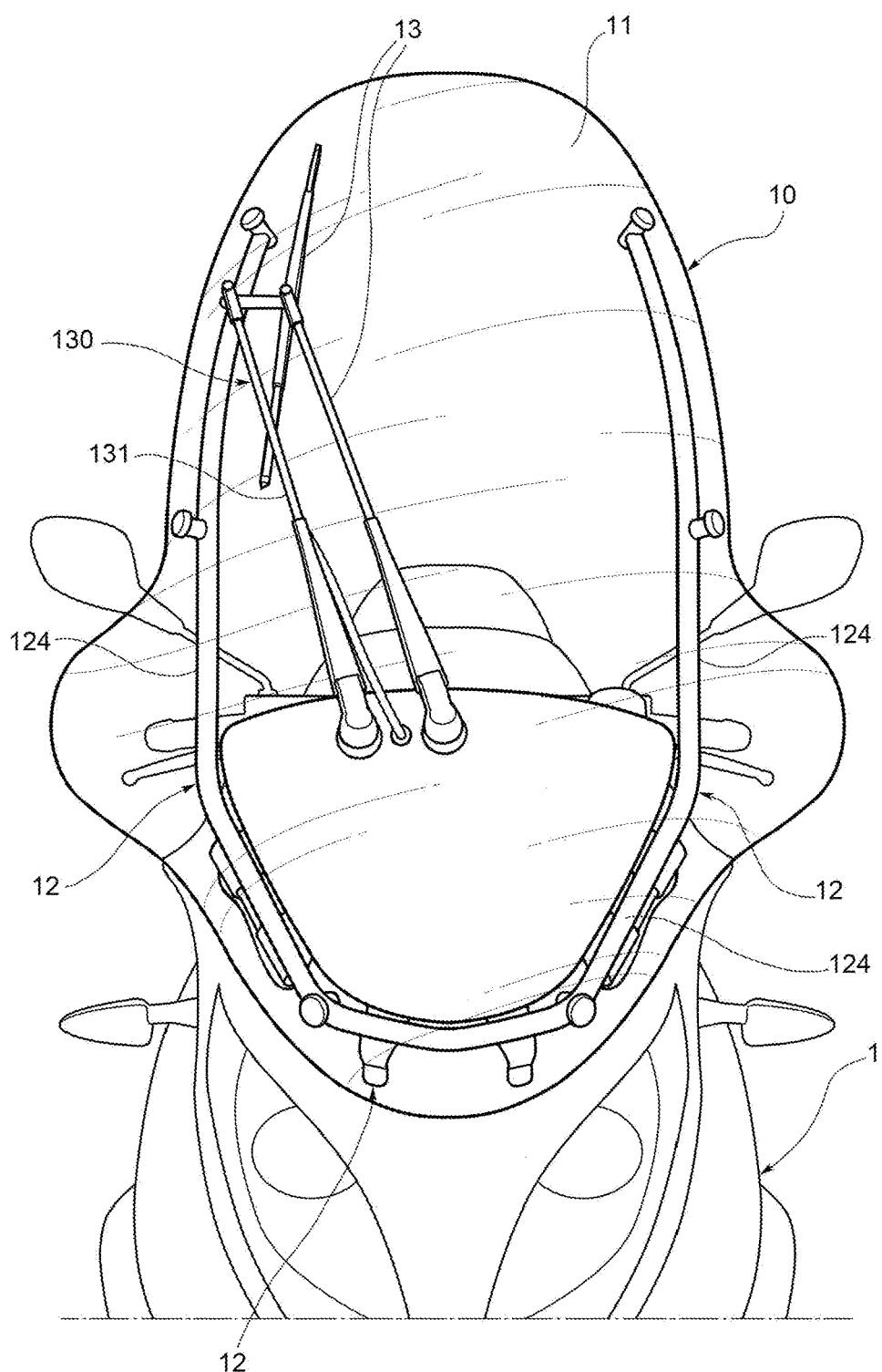
FIG. 1 is a three-dimensional front view partially representing a vehicle provided with a windscreen assembly according to a currently preferred embodiment.

With reference to FIG. 1, a vehicle 1 is shown having a vehicle frame (not shown because of known type) and comprising a windscreen assembly 10 according to a currently preferred embodiment. In the example, the vehicle 1 is a motor vehicle and more preferably a three-wheeled vehicle 1, or tricycle 1, having two rolling front wheels and a rear drive wheel. More preferably, the vehicle 1 is a three-wheeled vehicle equipped with two parallel and inclinable front steering wheels and a central rear drive wheel integral with the frame, so as to allow driving the vehicle as a motorcycle (front part inclinable—rolling motion—together with the rear), the front steering system (articulated quadrilateral) then being able to roll with respect to the rear part, and the front wheels being able in turn to incline like the rear wheel, however always remaining in contact with the ground and thus ensuring greater adherence to the road surface. A vehicle of this type is described, for example, in patent EP1561612 or patent EP1484239, both in in the name of PIAGGIO & C SPA. In any case, it is observed that the teachings of this description are not limited to this type of vehicle 1, or in general to a tricycle 1. In general, the vehicle 1 may be a motorised vehicle selected from an electric bicycle, a motorcycle, a moped, a scooter, a trike, an ATV (Quadricycle/Tricycle), a jet ski or a snowmobile. Even more generally, the vehicle 1 can be any vehicle with two/three/four wheels that may be homologated as a motorcycle, moped, tricycle or quadricycle. More preferably, the vehicle 1 may be any one of such vehicles, where such vehicles are vehicles without covering roof, or in any case without a roof cover of the fixed type integrated into the vehicle.

Figure 2:
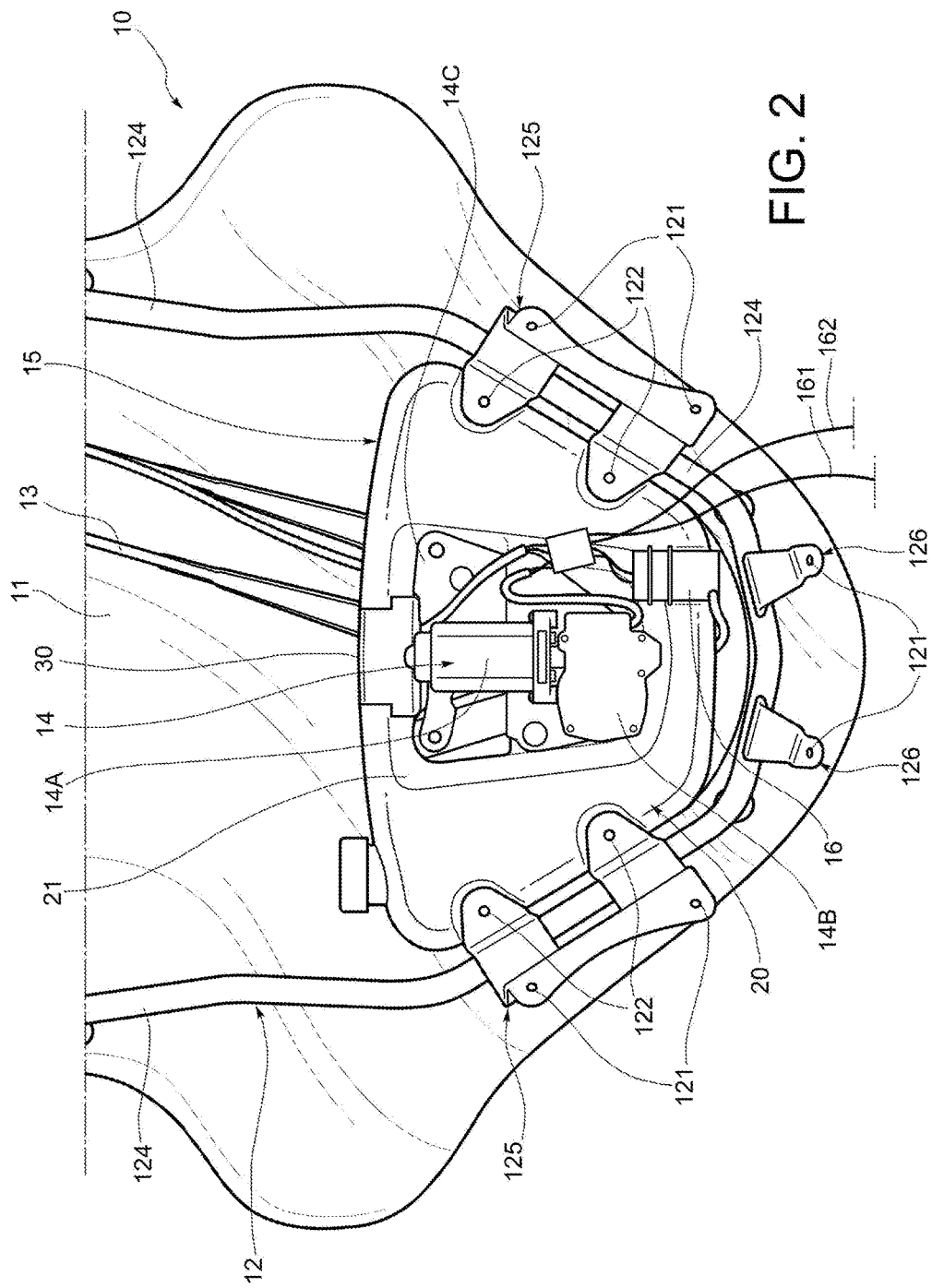
FIG. 2 is a partial three-dimensional view of the windscreen assembly of FIG. 1 detached from the vehicle of FIG. 1 in which the windscreen assembly is viewed from the side opposite the side shown in FIG. 1.

With reference to FIGS. 1 and 2, the windscreen assembly 10, comprises a windscreen panel group 11,12 and a wiper group 20 (FIG. 2). The windscreen panel group 11,12 comprising a windscreen panel 11, preferably a polycarbonate windscreen panel 11, and a support structure 12 to support the windscreen panel 11.

Figure 3:
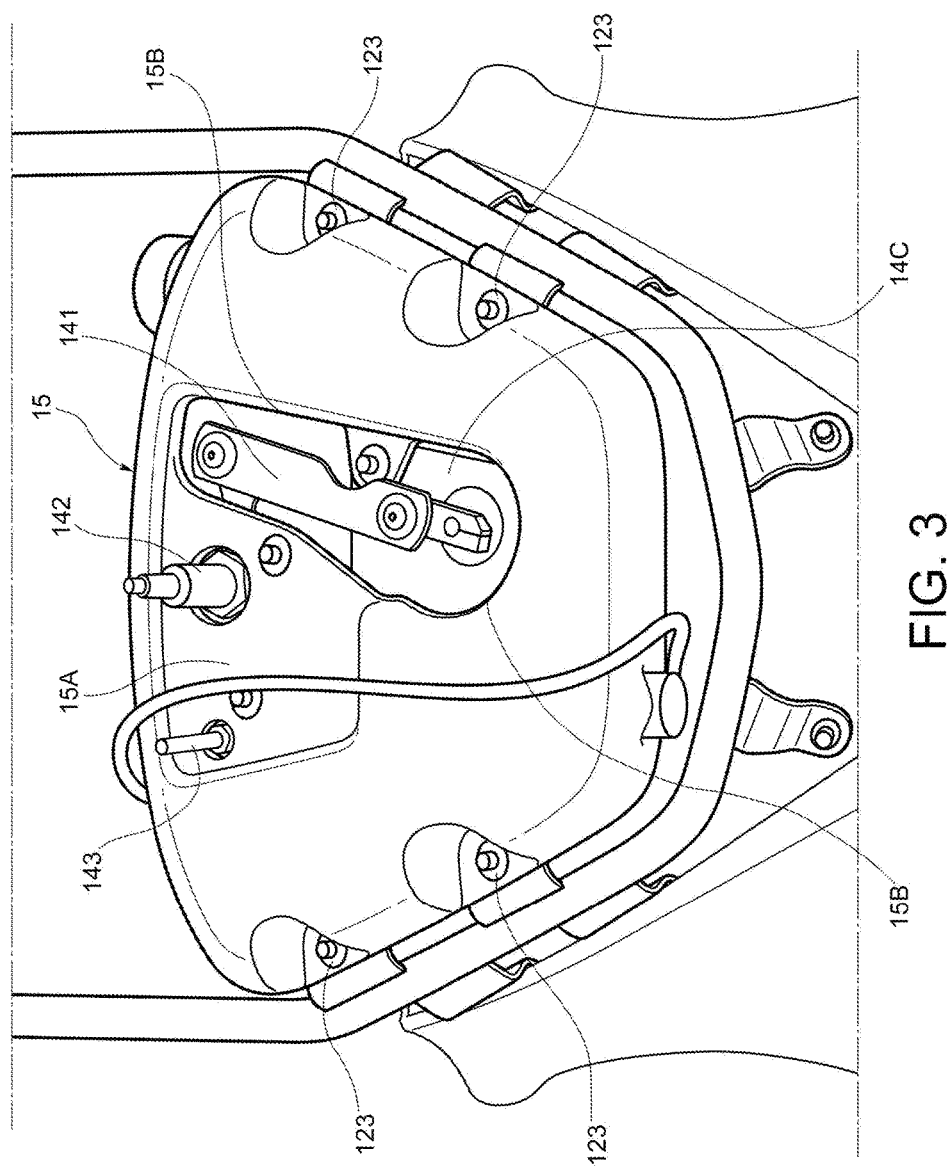
FIG. 3 is a three-dimensional front view that partially represents the vehicle and the windscreen assembly of FIG. 1, where in particular some parts of the windscreen assembly have been removed.

The wiper group 20 comprises a wiper 13, a drive motor group 14 to operate the wiper 13, a tank 15 for a liquid and pump 16 operatively connected to the tank 15. In manner in itself known, the tank 15 is preferably made of plastic and is suitable to contain a liquid that is intended to be sent on the windscreen panel 11 by means of the pump 16 to allow cleaning the windscreen panel 11 with the wiper 13. Preferably, the wiper group includes a pantograph mechanism 130 comprising the wiper 13. According to a preferred embodiment, the drive motor group 14 comprises a drive motor 14A operatively connected to a gear motor 14B. With reference to FIG. 3, preferably the drive motor group 14 is fixed to a tank wall 15A of the tank 15. More preferably, the drive motor group 14 is fixed to a fixing plate 14C, preferably a metal fixing plate 14C, that is in turn fixed, for example bolted, to the wall 15A. Preferably, the tank 15 comprises a tank through opening 15B that faces a transmission connecting rod 141 of the drive motor group 14. The opening 15B has the function of allowing the housing of the compound lever, including the connecting rod 141, that controls the motion of the wiper 13. The opening 15B is opportunely shaped to allow movement of the compound lever without interfering with the tank and to reduce the bulk of the wiper group 20. According to a preferred embodiment, the drive motor group 14 includes a drive shaft 142 (FIG. 3) that crosses the windscreen panel 11 and is operationally connected to the wiper 13. Preferably, the drive shaft 142 also passes through the tank 15 and more preferably passes through the tank wall 15A. If the wiper group 20 comprises the aforementioned pantograph mechanism 130, the windscreen assembly 10 preferably also comprises an auxiliary rotation axis 143 to which is rotatably connected a rod 131 of the pantograph mechanism 130.

Figure 4:
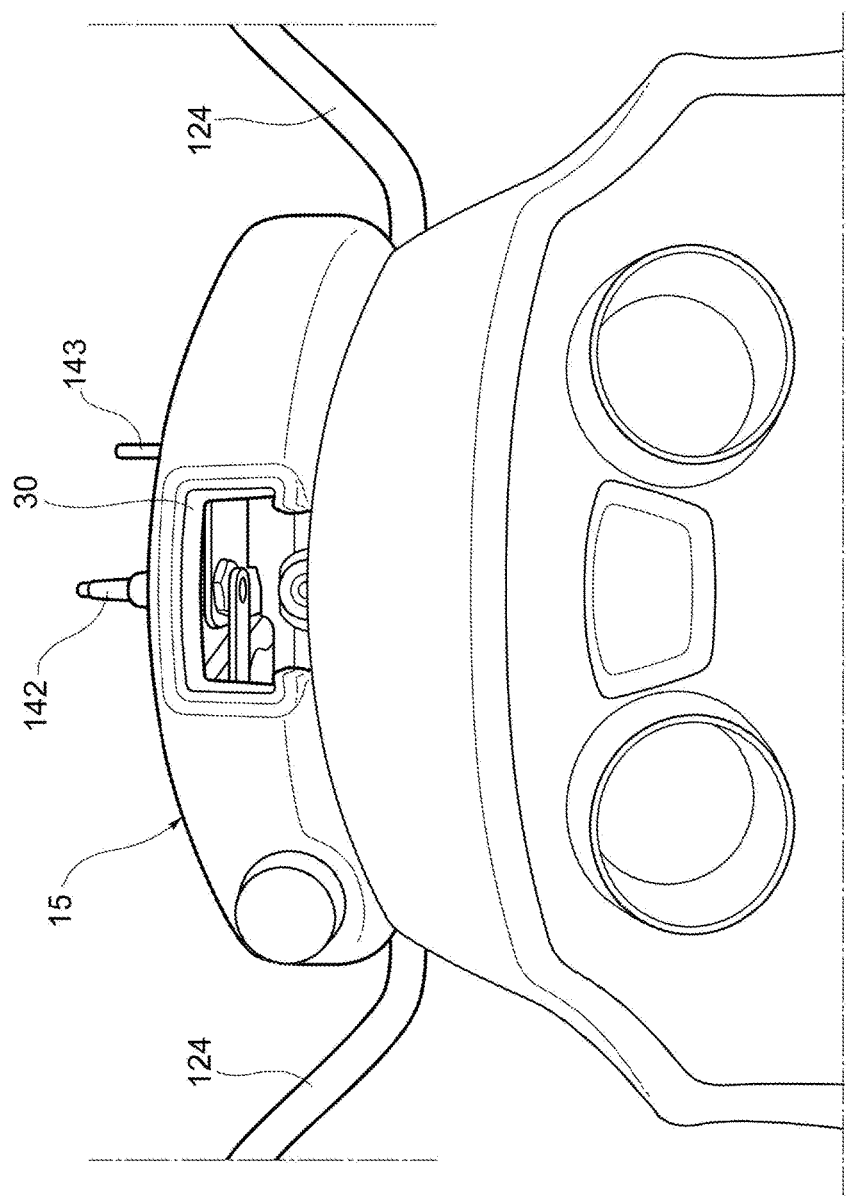
FIG. 4 is a three-dimensional top view that partially represents the vehicle and the windscreen assembly of FIG. 1, where in particular some parts of the windscreen assembly have been removed.

With reference to FIG. 4, according to a preferred embodiment, the windscreen assembly 10 comprises control elements (not shown since of known type) for controlling the drive motor group 14 and the pump 16. Such control elements may comprise for example a control panel, preferably comprising a button for actuating the drive motor group 14 and a button for actuating the pump 16 that are operatively connected to the motor group 14 and the pump 16. Preferably, the tank 15 comprises a housing seat 30 for housing the aforesaid control elements of the drive motor group 14 and the pump 16.

With reference to FIG. 2, the wiper group 20 is supported by the windscreen panel group 11,12. Conveniently, the windscreen assembly 10 is configured to be removably coupled to the vehicle 1. According to a preferred embodiment, the windscreen assembly 10 is configured to be removably coupled to the aforementioned vehicle frame (not shown) of the vehicle 1. According to an alternative embodiment, the windscreen assembly 10 can be mounted on the handlebar of the vehicle 1, preferably by means of suitable connection brackets.

According to a preferred embodiment, the support structure 12 is removably fixable to the vehicle frame and the drive motor group 14, the tank 15 and the pump 16 are supported by the support structure 12. Preferably, the tank 15 is fixed to the support structure 12 and the drive motor group 14 and the pump 16 are supported by tank 15. Preferably, the tank 15 is shaped so as to define a housing recess 21, having for example and not limitatively a generally quadrangular shape as shown in FIG. 2, in which is housed the drive motor group 14.

According to a preferred embodiment, the support structure 12 comprises first coupling elements 121, such as coupling holes 121, that are suitable to cooperate with corresponding second coupling elements (not shown) provided in the vehicle frame for removably fixing the support structure 12 to the vehicle frame. The second coupling elements (not shown) provided in the vehicle frame, may include for example frame holes corresponding to the coupling holes 121 in such a manner that the holes 121 and frame holes and can be traversed by respective coupling screws or by respective coupling bolts to fix the support structure 12 to the vehicle 1. Preferably, the windscreen assembly 10 also comprises connecting elements 122,123 (FIGS. 2 and 3) for removably fixing the tank 15 to the support structure 12. The connecting elements 122,123 comprise first connecting elements 122, such as for example first connection holes 122 provided in the support structure 12. Preferably the connecting elements 122,123 further comprise second connecting elements 123, which comprise for example connecting bolts 123 or connecting screws that are suitable to pass through the first connecting holes 122 and second connecting holes provided in the tank 15 to fix the tank 15 to the support structure 12.

With reference to FIGS. 1 and 2, according to a preferred embodiment, the support structure 12 comprises a support arm 124, generally "U" shaped, that is preferably removably coupled to the windshield panel 11, and a plurality of mounting brackets 125, in the example non-limitatively two brackets 125, which are integral, preferably welded, to the support arm 12. Each of the mounting brackets 125 includes at least one of the aforesaid first coupling elements 121 and at least one of said first connecting elements 122. In the example, each of the brackets 125 comprises a pair of coupling holes 121 and a pair of first connecting holes 122. Preferably, the support structure 12 also comprises auxiliary mounting brackets 126 that are integral, for example welded, to the support arm 124. In the example, the support structure 12 non-limitatively comprises two auxiliary mounting brackets 126, each of which comprises one of the first coupling elements 121, and more particularly a coupling hole 121.

According to a preferred embodiment, the mounting brackets 125 and preferably the auxiliary mounting brackets 126 are constituted of, or comprise, shaped mounting plates 125,126.

According to a preferred embodiment, the auxiliary brackets 126 are central brackets while the brackets 125 are side brackets that are arranged on opposite sides with respect to the auxiliary plates 126. According to a preferred embodiment, each bracket 125 comprises at least one mounting portion, such as for example, a mounting tab, protruding with respect to the support arm 124 and which comprises at least one of said first connecting elements 122. According to a preferred embodiment, each mounting bracket 125 also comprises a further mounting portion, such as for example, a further mounting tab, that comprises at least one of said first coupling elements 121 and which protrudes from the support arm 124 in the opposite direction or basically opposite to the protruding mounting portion comprising at least one of said first connecting elements 122.

Still with reference to FIG. 2, according to a preferred embodiment, the windscreen assembly 10 comprises at least one quick coupling electrical connector (not shown since of known type) operatively connected to at least one from among the drive motor group 14 and the pump 16. Such at least one quick coupling electrical connector, such as for example a male or female electrical connector, is configured to be connected with a complementary quick coupling electrical connector (not shown because of known type), such as for example a male or female connector, provided in the vehicle 1, and more preferably in the front part of the vehicle 1. Such complementary connector is connected for example to the battery or to another power supply device of the vehicle 1, and preferably to the aforesaid control elements so as to allow powering the wiper group 20. According to a convenient embodiment, since it makes particularly rapid the assembly and disassembly of the windscreen assembly 10 to/from the vehicle 1, there are provided a single quick coupling electrical connector electrically connected to the drive motor group 14 and the pump 16, for example by means of electrical cables 161,162 (FIG. 2) and a single complementary quick coupling electrical connector in the vehicle 1. According to a less preferred alternative embodiment, there may be provided a plurality of quick coupling electrical connector associated to the drive motor group 14 and the pump 16, for example a connector associated to the drive motor group 14 and a connector associated to the pump 16, and a plurality of corresponding complementary quick coupling electrical connectors provided in the vehicle 1. According to a still less preferred embodiment, the electrical cables 161,162 can be connected to the battery or to another power supply device of the vehicle 1 without providing quick coupling electrical connector.

Based on the above description, it is therefore possible to understand how a windscreen assembly according to this description allows achieving the purposes mentioned above with reference to the state of the prior art.

In fact, a windscreen assembly according to this description makes particularly rapid the installation of a relatively complete wiper system in the vehicle on which the windscreen assembly is mounted, since the windscreen assembly can be mounted/dismounted in bloc to/from the vehicle simply by mounting/dismounting the support structure to/from the vehicle frame. Furthermore, a windscreen assembly according to this description is easily interchangeable, if necessary, with a windscreen without wiper. In addition, a windscreen according to this description has a particularly low impact on the vehicle on which it is intended to be installed, as it can be installed as a normal windscreen without wiper, such as, for example, a windscreen without wiper standard, using the same fixing elements provided for such windscreen without wiper. Therefore, it is conveniently possible to easily replace such a windscreen assembly according to this description with a windscreen without wiper standard, and vice versa, without having to make any changes, for example to the frame.

Without prejudice to the principle of the invention, the forms of embodiment and details of construction may be varied widely with respect to what has been described and illustrated purely by way of non-limiting example, without thereby departing from the invention as defined in the appended claims.

The invention claimed is:

1. Windscreen assembly for a vehicle, comprising:
   a windscreen panel group comprising a windscreen panel and a support structure to support the windscreen panel; and
   a wiper group comprising a wiper, a drive motor group to operate the wiper, a tank for a liquid, and a pump operationally connected to the tank;
   wherein said wiper group is supported by the windscreen panel group and said windscreen group is configured to be removably coupled to a frame of said vehicle; and
   wherein said windscreen assembly can be mounted and dismounted as an integral unit to and from the vehicle by mounting and dismounting said support structure to and from the vehicle frame.

2. Windscreen assembly according to claim 1, wherein said vehicle comprises an electric bicycle, a motorcycle, a moped, a scooter, a trike, an ATV (Quadricycle/Tricycle), a jet ski, or a snowmobile.

3. Windscreen assembly according to claim 1, wherein said vehicle comprises a handlebar, and wherein the drive motor group, the tank and the pump are supported by the support structure.

4. Windscreen assembly according to claim 3, wherein the tank is fixed to the support structure and wherein the drive motor group and the pump are supported by tank.

5. Windscreen assembly according to claim 1, wherein the tank is shaped to define a housing recess wherein the drive motor group is accommodated.

6. Windscreen assembly according to claim 1, comprising a quick coupling electrical connector operatively connected to at least one of the drive motor group and the pump, said at least one electrical connector being configured to be connected with a complementary quick coupling electrical connector provided in said vehicle.

7. Windscreen assembly according to claim 1, including control elements for controlling the drive motor group and the pump, the tank including a housing seat for said control elements.

8. Windscreen assembly according to claim 1, wherein the wiper group includes a pantograph mechanism comprising said wiper.

9. Windscreen assembly according to claim 1, wherein the drive motor group includes a drive shaft which crosses the windscreen panel and is operationally connected to the wiper.

10. Windscreen assembly according to claim 3, wherein the support structure includes first coupling elements adapted to cooperate with corresponding second coupling elements provided in the vehicle frame to removably attach the support structure to the vehicle frame and wherein said windscreen assembly includes connecting elements for removably attaching the tank to the support structure, the connecting elements including first connecting elements provided in the support structure.

11. Windscreen assembly according to claim 10, wherein the support structure includes a support arm generally shaped as a "U" which is coupled to the windscreen panel and a plurality of mounting brackets integral to the support arm, each of said mounting brackets includes at least one of said first coupling elements and at least one of said first connecting elements.

12. Windscreen assembly according to claim 11, wherein each of said mounting brackets includes at least one mounting portion protruding with respect to the support arm and which includes at least one of said first connecting elements.

13. Windscreen assembly according to claim 12, wherein each of said mounting brackets further includes a further mounting portion that includes at least one of said first coupling elements and which protrudes from the support arm in the opposite direction or basically opposite to the protruding mounting portion comprising at least one of said first connecting elements.

14. Windscreen assembly according to claim 1, wherein said vehicle is a vehicle with two, three, or four wheels which may be homologated as a motorcycle, moped, tricycle or quadricycle, respectively.

15. A vehicle coupled to a windscreen assembly as defined in claim 1.

16. Windscreen assembly for a vehicle, comprising:
   a windscreen panel group comprising a windscreen panel and a support structure to support the windscreen panel; and
   a wiper group comprising a wiper, a drive motor group to operate the wiper, a tank for a liquid, and pump operationally connected to the tank;
   wherein said wiper group is supported by the windscreen panel group and said windscreen group is configured to be removably coupled to a frame of said vehicle; and
   wherein the windscreen assembly further comprises a mounting bracket for removably fixing the tank to the support structure and the support structure to the frame, such that said windscreen assembly can be mounted and dismounted as an integral unit to and from the vehicle by mounting and dismounting said support structure to and from the vehicle frame.

* * * * *